United States Patent [19]
Carter, Jr.

[11] Patent Number: 5,944,283
[45] Date of Patent: Aug. 31, 1999

[54] CRASHWORTHY LANDING GEAR SHOCK

[75] Inventor: Jay W. Carter, Jr., Burkburnett, Tex.

[73] Assignee: Cartercopters, LLC, Wichita Falls, Tex.

[21] Appl. No.: 08/985,892

[22] Filed: Dec. 5, 1997

Related U.S. Application Data

[60] Provisional application No. 60/033,260, Dec. 9, 1996.

[51] Int. Cl.$^6$ ..................................................... B64C 25/58
[52] U.S. Cl. .............................. 244/104 FP; 244/100 R; 244/104 R; 267/64.13; 267/64.15; 188/289; 188/182.14
[58] Field of Search ......................... 244/104 FP, 104 R, 244/100 R; 267/64.13, 64.15; 188/289, 182.14, 322.19, 319.1, 319.2, 313, 314

[56] References Cited

U.S. PATENT DOCUMENTS

| | | |
|---|---|---|
| 2,554,581 | 5/1951 | Levy . |
| 2,608,404 | 8/1952 | Gruss . |
| 2,630,990 | 3/1953 | Kanode et al. . |
| 2,856,180 | 10/1958 | Westcott, Jr. . |
| 2,883,181 | 4/1959 | Hogan . |
| 2,919,127 | 12/1959 | Prescott . |
| 2,956,796 | 10/1960 | Devillers . |
| 3,171,546 | 3/1965 | Frederick . |
| 3,393,883 | 7/1968 | Smith et al. . |
| 3,483,952 | 12/1969 | Cardwell . |
| 3,888,436 | 6/1975 | Sealey . |
| 3,954,232 | 5/1976 | Harper . |
| 4,088,286 | 5/1978 | Masclet et al. . |
| 4,284,177 | 8/1981 | Domek . |
| 4,356,898 | 11/1982 | Guzder et al. . |
| 4,630,788 | 12/1986 | Veaux et al. . |
| 4,729,529 | 3/1988 | Hrusch . |
| 4,821,983 | 4/1989 | Aubry et al. . |
| 4,867,286 | 9/1989 | Taylor . |
| 4,964,493 | 10/1990 | Yamaura et al. . |
| 4,995,597 | 2/1991 | Hatton . |
| 5,158,267 | 10/1992 | Pascal . |
| 5,279,480 | 1/1994 | Derrien . |
| 5,294,077 | 3/1994 | Derrien . |
| 5,310,140 | 5/1994 | Veaux et al. . |
| 5,330,132 | 7/1994 | Lucienne et al. . |
| 5,337,976 | 8/1994 | Derrien . |
| 5,464,079 | 11/1995 | Lohberg et al. . |
| 5,848,675 | 12/1998 | Gonzalez . |

FOREIGN PATENT DOCUMENTS 1655647  8/1971  Germany ............................ 267/64.15

*Primary Examiner*—Charles T. Jordan
*Assistant Examiner*—Tien Dinh
*Attorney, Agent, or Firm*—James E. Bradley

[57] ABSTRACT

A shock absorber, optionally operable as a retractable landing gear actuator, includes a sealed cylinder divided by a cylinder head to define an upper chamber and a lower chamber, the lower chamber further divided by a piston having a piston rod passing in sealed manner through the lower cylinder end. The cylinder head includes one or more orifices, the effective opening of each orifice controlled by a valve, the valve having a stem attached to and passing through the upper cylinder end to the atmosphere, such that the pressure between the piston and the cylinder head is limited to a certain value above atmospheric pressure, regardless of the velocity or position of the piston. The valve is forced toward the closed position by a spring against a stop such that it is always at least partially open. During hard or crash landings, high fluid pressure on the piston or in the upper chamber forces the valve further open.

24 Claims, 11 Drawing Sheets

CRASHWORTHY LANDING GEAR SHOCK

This application claims the benefit of U.S. Provisional application Ser. No. 60/033,260, filed Dec. 9, 1996.

TECHNICAL FIELD

This invention relates in general to a landing gear retraction, suspension, shock absorption, and crash energy absorption system for aircraft.

BACKGROUND ART

Various combinations of springs and shock absorbers are known to absorb the landing energy of aircraft and provide suspension. Electric, hydraulic, or pneumatic systems have been used to extend and retract the gear, in some cases using the shock absorbing cylinder as an actuator. Most prior shock absorbing systems have the characteristic that high forces associated with hard or crash landings will structurally fail the shock absorbers before any significant energy is absorbed, so the structure and passengers absorb all crash forces. Other prior systems absorb crash forces by permanently deforming a portion of the shock absorbing device.

A primary object of the invention therefore is to provide a combined suspension and shock absorber having a simple pressure limiting means that operates during hard or crash landings, such that maximum impact energy is absorbed before the shock absorber bottoms or fails.

A further object of the invention is to provide such a suspension and shock absorber which is also operable as an actuator for a retractable landing gear.

A further object is to provide a retractable landing gear actuator as above which can be powered with low pressure air or other gas.

The above as well as additional objects, features, and advantages of the invention will become apparent in the following detailed description.

BEST MODE FOR CARRYING OUT INVENTION

Figure 1A:
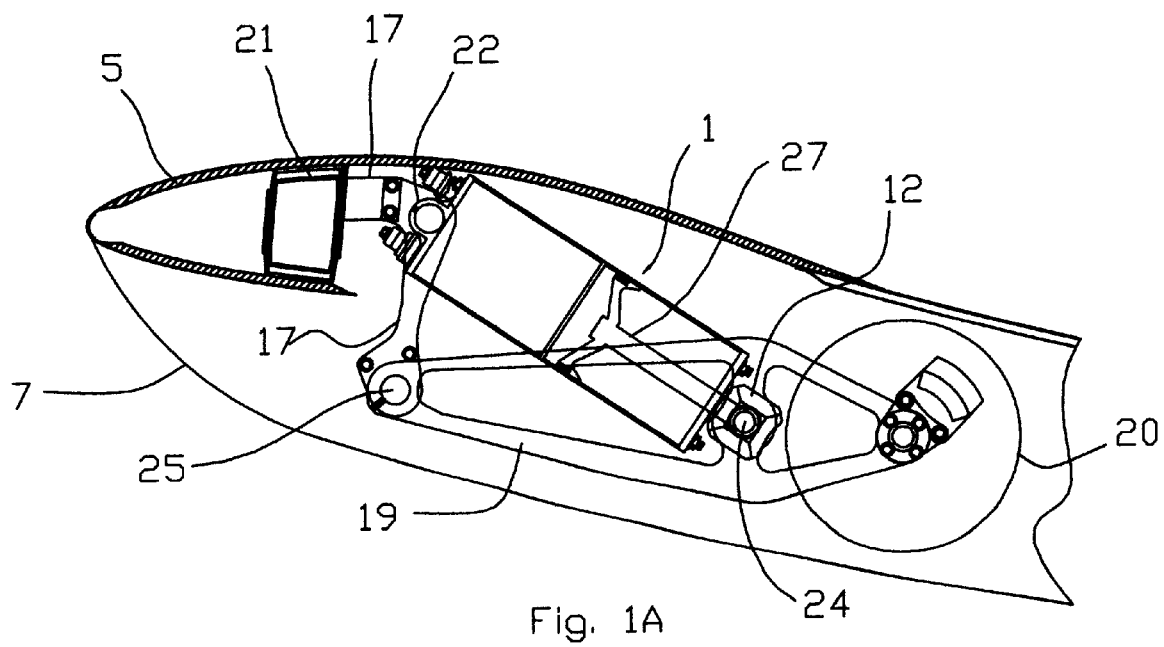
FIG. 1A shows a retractable landing gear installation in the tail boom of an aircraft, with the landing gear retracted.
Figure 1B:
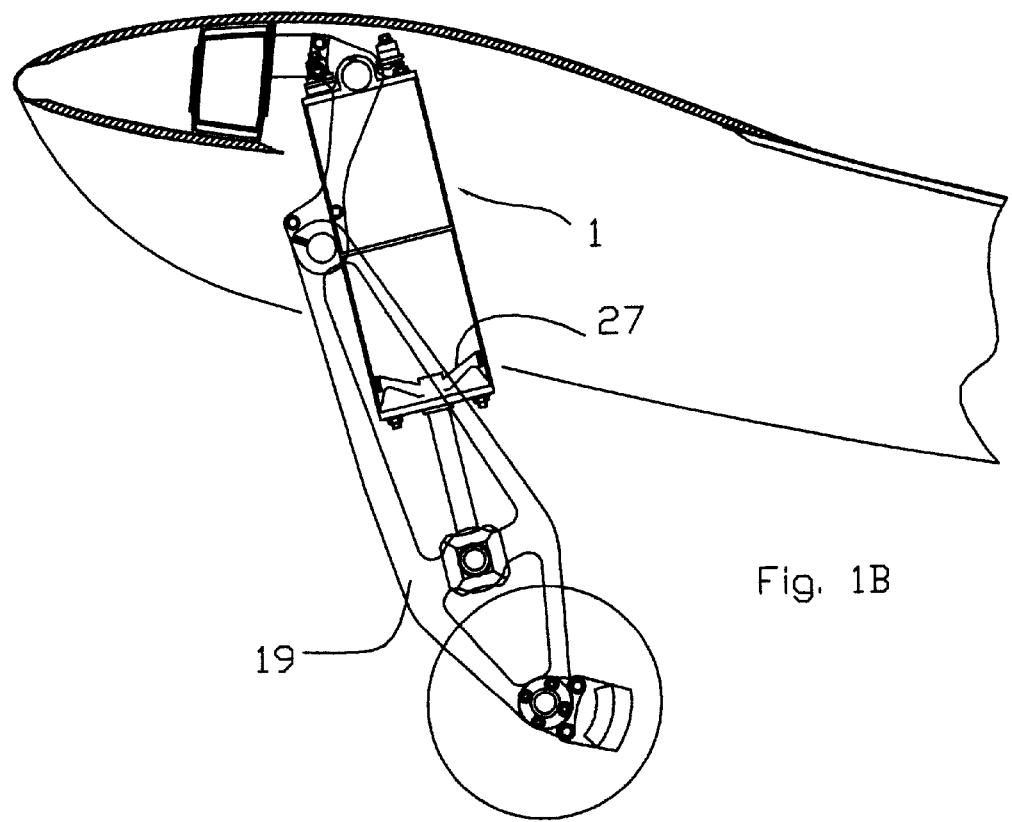
FIG. 1B shows a retractable landing gear installation as in FIG. 1A, with the landing gear extended.

FIG. 1A and 1B show a side view of a retractable landing gear installation in the tail boom of an aircraft, with the landing gear retracted and extended respectively. Referring to FIG. 1A, boom 7 is attached to wing 5, which is structurally connected to the aircraft. Landing gear bracket 17 is bolted to spar 21 and to the side walls of boom 7. Landing gear leg 19 holds wheel 20 and pivots on landing gear bracket 17 at 25. Cylinder assembly 1 is pivotably attached to landing gear bracket 17 at 22, and piston rod 27 is attached to trunion 12 which pivots at point 24 in landing gear leg 19. As shown in FIG. 1B, when cylinder assembly extends, it pushes landing gear leg 19 downward, lowering the landing gear. When taxiing, landing gear leg 19 is in an intermediate position between its retracted and extended positions, and cylinder assembly 1 acts as a suspension and shock absorber.

Figure 2A:
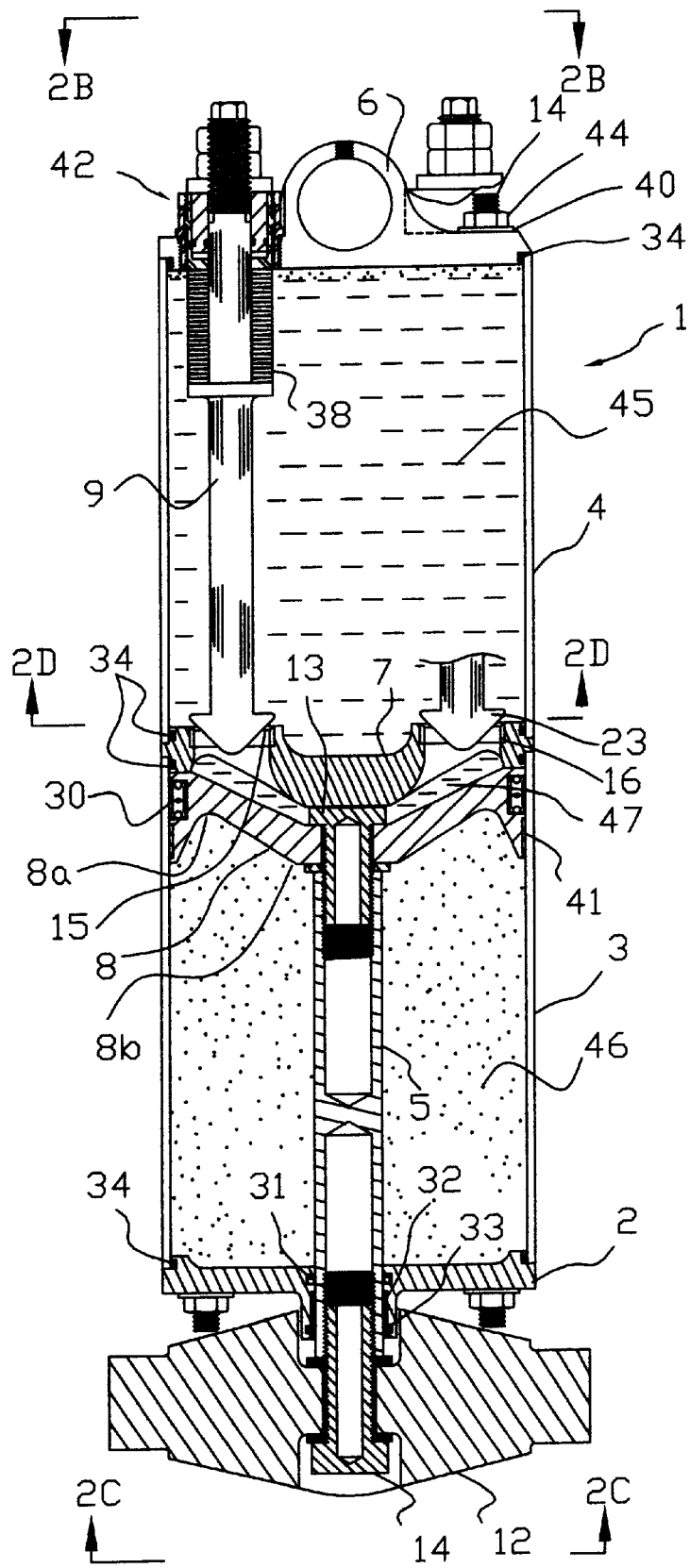
FIG. 2A shows a landing gear cylinder with fluid in the retracted position with a needle valve at minimum opening and constructed in accordance with the invention.

FIG. 2A shows a side view cross section of the cylinder assembly 1 in retracted position. Cylinder assembly 1 consists of lower cylinder 3 and upper cylinder 4 separated and sealed by cylinder head 7. Top cap 6 seals the top of upper cylinder 4 and provides an attachment for a shaft (not shown) on which the cylinder assembly 1 pivots and attaches to the airframe of an aircraft (see FIG. 1). Bottom cap 2 seals the bottom of lower cylinder 3. Piston 8 is located within cylinder 3 and is attached to piston rod 5 by bolt 13. Piston 8 has a lower side which is has an annular concave portion 8a surrounding a convex central portion 8b. Piston 8 has an upper side which is concave. Piston rod 5 passes through bottom cap 2 sliding on Teflon bushing 32 and sealed by piston seal 31 and wiper seal 33. Trunion 12 attaches to piston rod 5 and to the aircraft landing gear leg 19. Piston 8 slides in lower cylinder 3 on Teflon ring 41 and is sealed by a piston seal 30. Piston rod 5 is hollow to reduce weight. When the piston 8 is in the retracted position shown in FIG. 2A, volume 45 located within upper cylinder 4 is full of a generally non-compressible fluid, such as hydraulic fluid, except for a small volume of gas at atmospheric pressure; volume 47, located between the piston 8 and cylinder head 7, is full of oil; and volume 46, located below piston 8, is full of pressurized gas at a preselected pressure (e.g. approximately 180 PSI).

Figure 2B:
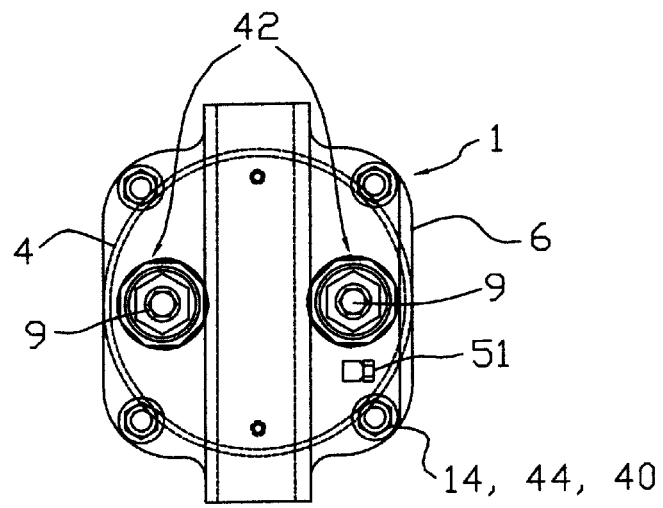
FIG. 2B shows a top view of the landing gear cylinder.
Figure 2C:
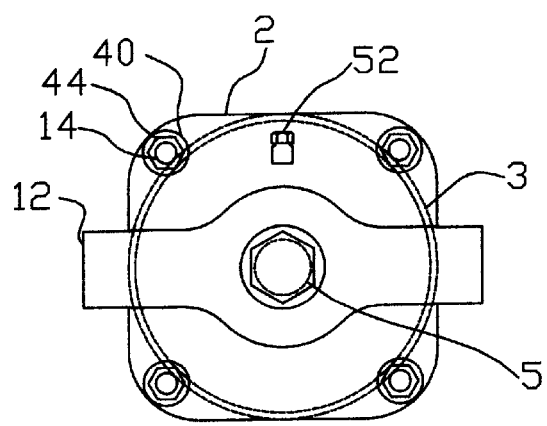
FIG. 2C shows a bottom view of the landing gear cylinder and trunion.
Figure 2D:
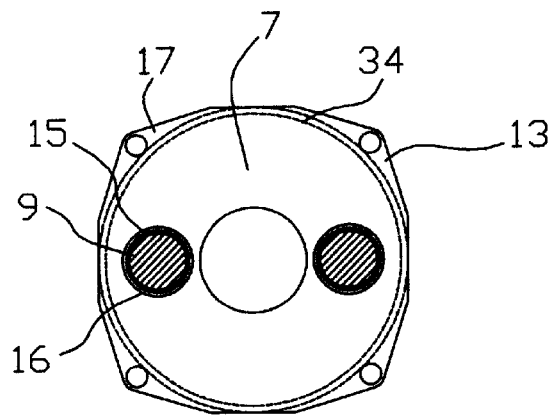
FIG. 2D shows a cross section through the cylinder, taken along line 2D—2D of FIG. 2A.

As can be seen most clearly with reference to FIGS. 2B through 2D, cylinder assembly 1 is held together with four cylinder bolts 14, each of which extends through the top cap 6, along the outside of the upper cylinder 4, through flange 17 (see FIG. 2D) of cylinder head 7, along the outside of lower cylinder 3, and through the bottom cap 2. Washers 40 and nuts 44 on the ends of the cylinder bolts 14 hold cylinder assembly 1 together. All stationary joints are sealed with o-rings 34, 35, 36, 37 and 43.

Again with reference to FIG. 2A, a pair of valve assemblies 42, which are later described more fully with reference to FIG. 5, each provide a mounting for valve stem 9 such that valve stem 9 is held in the down position by Belleville washers 38, but moves up through top cap 6 as necessary to control pressure in volume 47.

In FIG. 2A, the valve stem 9 is shown in its fully closed position, as it would be during flight, taxi and gentle landings. The lower end of valve stem 9 terminates in a conical portion 23. When valve stem 9 is in its fully closed or restricted position, a slight clearance (e.g. 0.08 inch) exists between the conical portion 23 of the valve stem 9 and valve seat 16 surrounding orifice 15 formed in the cylinder head 7. The exact clearance depends on the diameter of orifice 15, number of orifices 15, cylinder diameter, damping required, and maximum energy absorption required.

FIG. 2B is a top view of the landing gear cylinder assembly 1. Top cap 6 seals the top end of upper cylinder 4. Four cylinder bolts 14 pass through top cap 6, and nuts 44 and washers 40 hold top cap 6 onto the landing gear cylinder assembly 1. The two valve assemblies 42 that carry the two valve stems 9 are mounted to the top cap 6. A top cap gas pressure fitting or nipple 51 is sealingly threaded into top cap 6 and is used to introduce pressurized gas into cylinder 4 (FIG. 2A), to force the landing gear to the extended position when the cylinder assembly 1 is used as a landing gear actuator.

FIG. 2C shows a bottom view of the landing gear cylinder assembly 1. Bottom cap 2 seals the bottom end of lower cylinder 3. The four cylinder bolts 14 pass through bottom cap 2, and nuts 44 and washers 40 hold bottom cap 2 onto the landing gear cylinder assembly 1. Piston rod 5 passes through the center of bottom cap 2. A bottom cap gas pressure fitting or nipple 52 is threaded through bottom cap 2 and is used to introduce pressurized gas into volume 46 (FIG. 2A) of lower cylinder 3 to force the landing gear to the retracted position, when the cylinder assembly 1 is used as a landing gear actuator. Trunion 12 is used to couple piston rod 5 to landing gear leg 19 (FIG. 1A).

FIG. 2D shows a cross section of the cylinder head 7, showing orifice 15 which communicates by a gap between orifice insert 16 and valve stem 9. Orifice 15 communicates between volume 45 (FIG. 2A) and volume 47 (FIG. 2A) through the cylinder head 7. Orifice insert or seat 16 prevents fluid wear on cylinder head 7, with the size of the orifice 15 being defined by the opening inside orifice insert 16. In FIG. 2A, orifice 15 is partially closed by valve 9 at minimum opening position. For best performance, orifices 15 should be large enough or numerous enough so that when in an open position as shown in FIGS. 3 and 5, orifices 15 are not a significant restriction to flow, even during impacts where the vertical velocity is as high as 40 feet per second (a crash), and therefore do not create a significant pressure drop when the valve 9 is fully open.

The landing gear cylinder assembly 1 can be used as a shock absorber and suspension without the landing gear retraction and extension feature. In this version, the top cap gas pressure fitting 51 and bottom cap gas pressure fitting 52 are used only to preset the internal pressure on the ground, then they are sealed.

Figure 3:
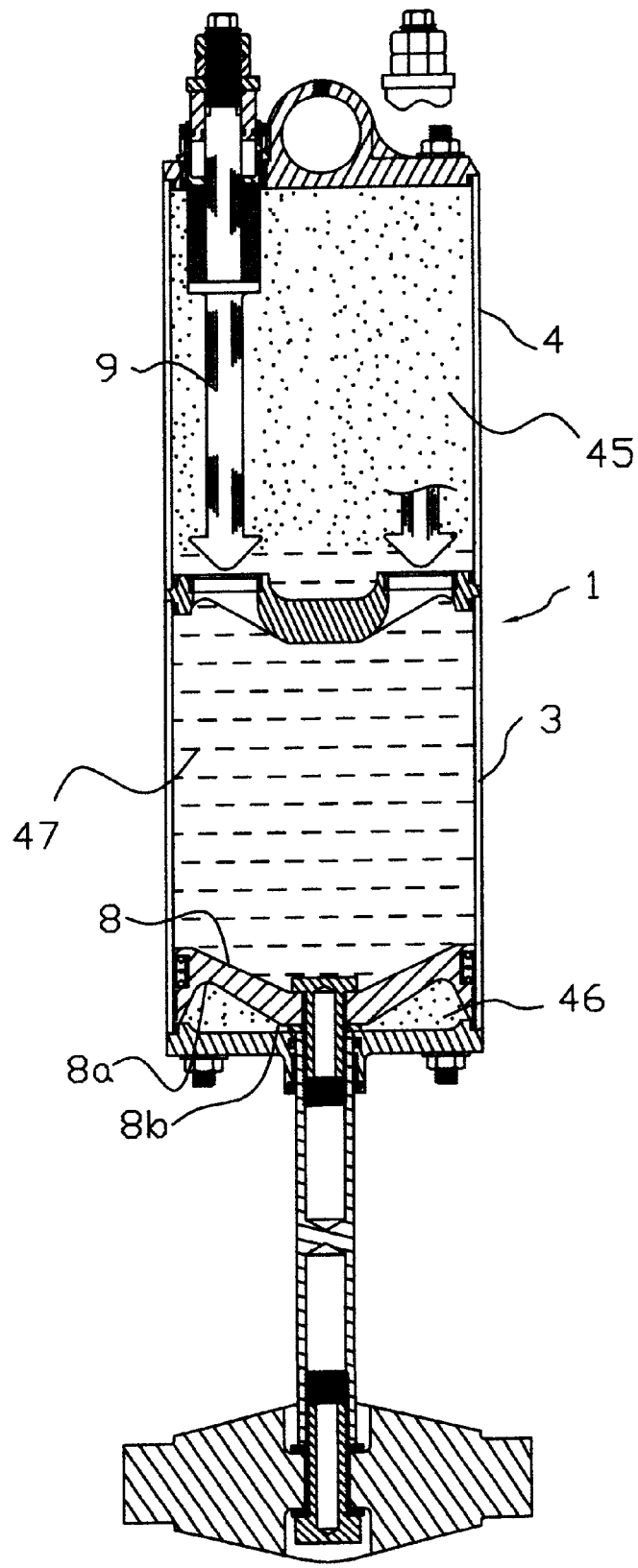
FIG. 3 shows the landing gear cylinder with fluid in the extended position, with the needle valve at a near maximum open position.

FIG. 3 shows a side view detail of the cylinder assembly 1 with the piston 8 in the extended position, as it would be in flight just prior to landing. With piston 8 fully extended, volume 47 is completely filled with hydraulic fluid, volume 45 is predominately filled with air or gas at a preselected pressure (e.g. approximately 80 PSI), and volume 46, principally below concave portion 8a, contains air or gas at atmospheric pressure. Valve stem 9 is shown in a near fully open position, as it would be a moment after contact during a hard or crash landing. This is because pressure in volume 47 would be high and would force valve stem 9 upward toward the open position.

Figure 4:
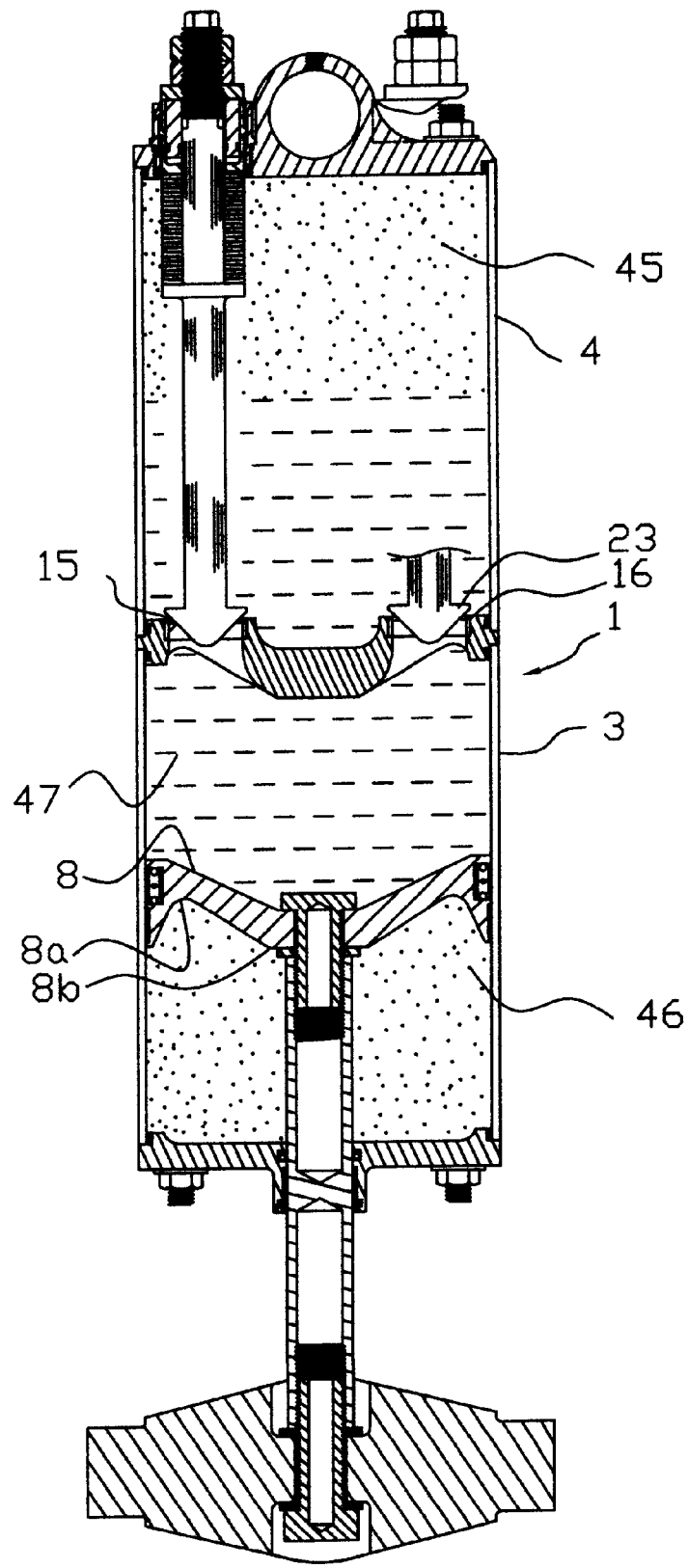
FIG. 4 shows the landing gear cylinder in taxi position, with needle valve at minimum opening.

FIG. 4 shows the cylinder assembly 1 in an intermediate position, such as would exist during taxi. The air in volume 45, initially at a preselected pressure of approximately 80 PSI before landing, is compressed by the weight of the aircraft after landing, until the air supports the aircraft. Thereafter, when slight impacts are encountered, the piston 8 moves upward through cylinder 3, squirting hydraulic fluid through orifice 15 into volume 45 of cylinder 4. The restricted flow through orifice 15 acts as a shock absorber. Between impacts, the higher gas pressure in volume 45, in excess of the pressure in volume 47, forces oil within volume 45 back through the orifice 15 and into volume 47, forcing the piston 8 downwards towards the extended position. The cylinder assembly 1 is then ready for the next impact. The pressure of the air in volume 46 below piston 8 remains atmospheric whether the shock absorber is retracted or extended.

Figure 5:
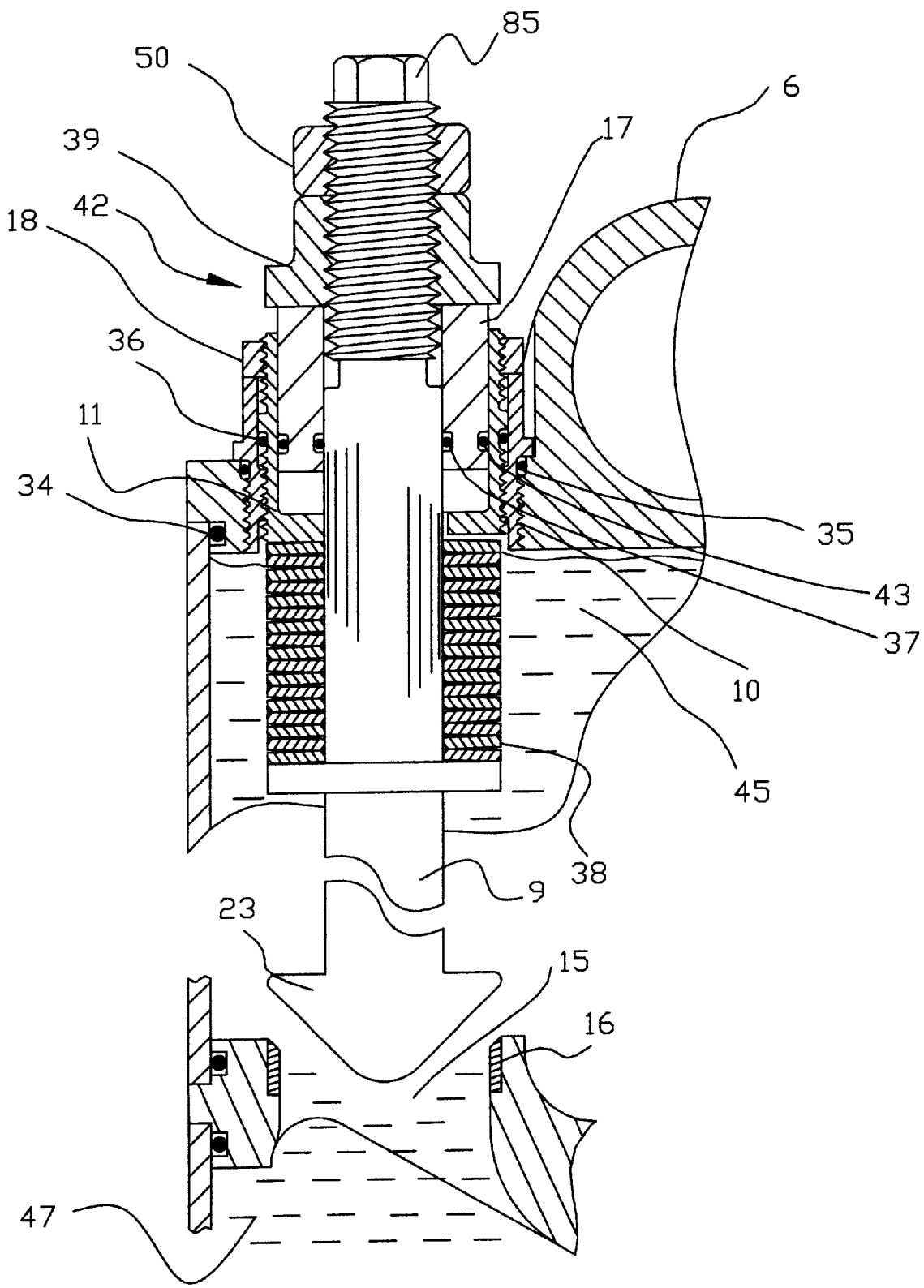
FIG. 5 shows an enlarged view of the valve and its attachment, with the valve at a near maximum open position.

FIG. 5 is an enlarged view of the valve assembly 42 that carries valve stem 9, as was shown in FIG. 2A. An outer sleeve 10 threads into end cap 6 to provide extended and wear-resistant internal threads for mounting valve assembly 42. Inner sleeve 11 threads into sleeve 10 and is locked in place by nut 18, such that the position of inner sleeve 11 sets the minimum opening between valve head 23 and orifice insert 16. Orifice insert 16 protects the edges of orifice 15 from fluid erosion. Valve piston 17 slides sealingly against valve stem 9 only during adjustment of the preload (preset compression) of Belleville washer spring 38. Belleville washer spring 38 is composed of numerous Belleville washers stacked in alternating orientation. Valve piston 17 moves together with valve stem 9 during operation, sliding sealingly against sleeve 11. Pressure in upper chamber 45 acts on valve piston 17, which pushes on flange nut 39 and acts to move the valve stem 9 upward. All stationary and sliding joints are sealed by o-rings 34, 35, 36, 37, and 43.

Figure 6:
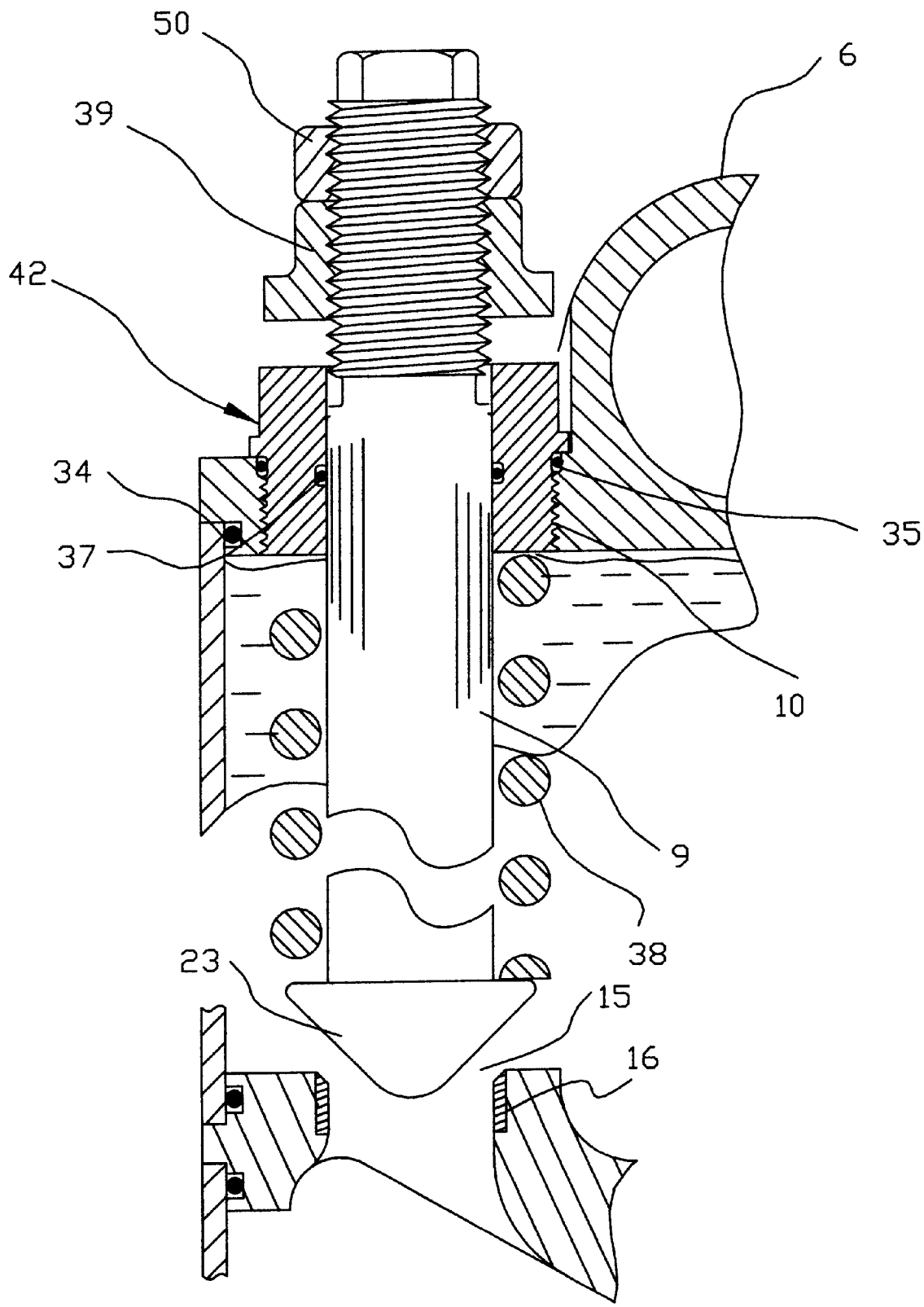
FIG. 6 shows an alternate embodiment of the valve and its attachment.

The function of valve piston 17 is to make the valve stem 9 respond only to the difference between the pressure in volume 47 and atmospheric pressure, regardless of the pressure in volume 45. In order for valve stem 9 not to respond to pressure in volume 45, the outer diameter of valve piston 17 must be the same as the diameter of the orifice 15. When these two diameters are equal, pressure in volume 45 acts equally on valve piston 17 and on the top surface of mushroom-shaped portion of valve stem 9, producing no resultant force. Thus the only force acting on valve stem 9 is the pressure in volume 47 acting on the area of the end of valve stem 9, and atmospheric air pressure acting on the other end of valve stem 9 and valve piston 17. The same result could be achieved, as shown in FIG. 6, by making valve stem 9 a constant diameter, equal to that of the orifice 15 and eliminating valve piston 17, but this would require a two piece valve stem so that the Belleville washers could be installed. There are many variations but the key is that the area of the valve stem where it seals against the atmosphere should be the same size as the area of the orifice.

Now referring again to FIG. 5, flange nut 39 locked by nut 50 applies a preset compression force (preload) to the Belleville washer spring 38, which determines the pressure drop across orifice 15 at which valve stem 9 begins to move, and thereby further opening the orifice 15. The minimum opening position of valve stem 9 is adjusted by nut 18 to obtain the appropriate degree of damping for routine shocks and taxiing. If the minimum opening position is too small, the ride is harsh or stiff. If it is too large, the ride is bouncy.

The preload on Belleville washer spring 38 at the minimum opening position is selected to set the maximum pressure in volume 47 above the piston 8. If the preload is too high, the initial pressure above piston 8 due to the initial impact velocity is so high as to immediately fail the cylinder assembly 1. If the preload is too low, the initial pressure is low, but the deceleration is also low so the cylinder bottoms and structurally fails before the desired amount of deceleration has occurred. If the preload is correct for a given target descent rate, the initial pressure is just below the material fatigue limit, the deceleration is a maximum and the total energy absorbable during the travel is a maximum. The preload (and the spring rate) also affects the maximum travel of the spring, which together with the minimum opening position governs the maximum opening position of valve stem 9. The maximum opening position governs the maximum initial vertical velocity that can be sustained without excessive pressure in volume 47 immediately rupturing the cylinder.

The spring rate of Belleville washer spring 38 should be low so that the pressure required to depress the Belleville washers is nearly constant throughout the travel of valve stem 9. The spring rate decreases proportionally with an increase in the number of Belleville washers used. The number of Belleville washers used is selected to provide a reasonably low spring rate, but also to achieve a reasonably low weight. For maximum energy absorption at a given preload, however, the minimum opening position would be zero. Since these effects are interrelated, the selected combination of the spring rate and travel of Belleville washer spring 38, the preset compression of Belleville washer spring 38, and the minimum opening position of valve stem 9, is a compromise to achieve good damping during normal landing and taxiing yet also good maximum energy absorption. Additional mechanisms shown in FIGS. 7 and 8 further improve the damping characteristics while retaining or improving the maximum energy absorption characteristics.

On landing, oil in volume 47 is forced through orifice 15. At low piston velocity, such as during gentle landings, oil passes through the minimum opening of orifice 15 without further opening the valve, because the preload on the Belleville washer spring 38 is set to hold the valve stem 9 at minimum opening until a given pressure is reached in volume 47. This pressure is not reached during gentle landings. As the landing gear continues to compress, oil flowing through orifice 15 decreases the volume of air in upper chamber 45, increasing its pressure. Pressure in volume 47 is the sum of the pressure in upper chamber 45 and the pressure drop across the orifice 15, when the piston is moving upward. So when the pressure above piston 8 exceeds the pressure necessary to support the weight applied to the landing gear wheel supported by this cylinder 1, the cylinder assembly 1 begins to decelerate the aircraft. The aircraft continues to decelerate until its vertical velocity has been halted. At this point the compressed air in upper chamber 45 may be in excess of the pressure needed to support the weight on this wheel, so the aircraft is gently forced back upwards, although much more slowly than the initial descent. The down-up oscillation is damped by the restricted oil flow through the orifice 15.

During taxi, piston 8 rises until the pressure in volume 45 reaches the level needed to support the aircraft. The gas or air within volume 45 works like a spring, and the oil flowing back and forth through orifice 15 acts to damp oscillations, the combination of which provides a soft suspension during taxi. The initial pressure in volume 45 is set such that piston 8 moves to approximately two thirds of its range of motion before the pressure in volume 45 will support the aircraft, when the aircraft is moderately loaded and stationary.

During a hard landing, the velocity of piston 8 creates a pressure in volume 47 sufficient to create a force on the conical end 23 of the valve stem 9 so that the valve stem 9 is forced upward against the spring force of Belleville washer spring 38. The movement of valve stem 9 increases the area of flow through the orifice 15, maintaining a nearly constant pressure in volume 47 regardless of piston velocity, and preventing rupture of cylinder 3. The pressure in volume 47 will begin at the maximum set by the preload of Belleville washer spring 38. As the aircraft decelerates, the velocity of fluid through the orifice decreases, and valve stem 9 closes to maintain a nearly constant pressure in volume 47. As the cylinder nears the bottom of its travel, volume 45 is nearly full of oil and so the remaining air in volume 45 is highly compressed. When the aircraft is moving downward, the pressure in volume 45 plus the pressure drop across the orifice equals the pressure in volume 47. Therefore when the aircraft is moving downward, the pressure in volume 47 is always higher than the pressure in volume 45. The goal is to stop the aircraft before the pressure in volume 47 becomes so high as to rupture the cylinder. By adjusting the preload and minimum opening, it is possible to make the initial pressure in volume 47 and the final pressure in volume 47 approximately equal and both below the fatigue limit of the structural material, thereby maximizing the energy absorption that can be sustained with no structural damage.

During a crash landing up to a certain vertical velocity, cylinder assembly 1 does not rupture immediately and is capable of absorbing maximum energy throughout its stroke before destructively bottoming, thereby reducing the chances of occupant injury and aircraft damage. The area for flow through the orifices 15, governs the pressure drop across orifices 15 and the pressure above piston 8 when valves 9 are totally open, and thereby determines the maximum crash velocity the cylinder assembly 1 could experience before immediate failure would occur. To achieve a large maximum opening, the travel of Belleville washer spring 38 beyond the preload should be large.

When the cylinder assembly 1 is used for extension or retraction of the landing gear, cylinders 3 and 4 are of relatively large diameter so that low pressure air or other gas can be used. In the retracted position (FIG. 2A), air pressure on port 52 (FIG. 2C) holds piston 8 in the up position and exerts the retracting force. Air within volume 45 is vented through port 51 (FIG. 2D). To extend the gear, port 52 and the air in volume 46 is vented to the atmosphere and pressurized air is introduced through port 51. So that the landing gear could be extended in the event of an in flight air pressure system failure, the air pressure in volume 46 is first charged into volume 45 and volume 45 sealed before volume 46 is vented to the atmosphere.

Figure 7:
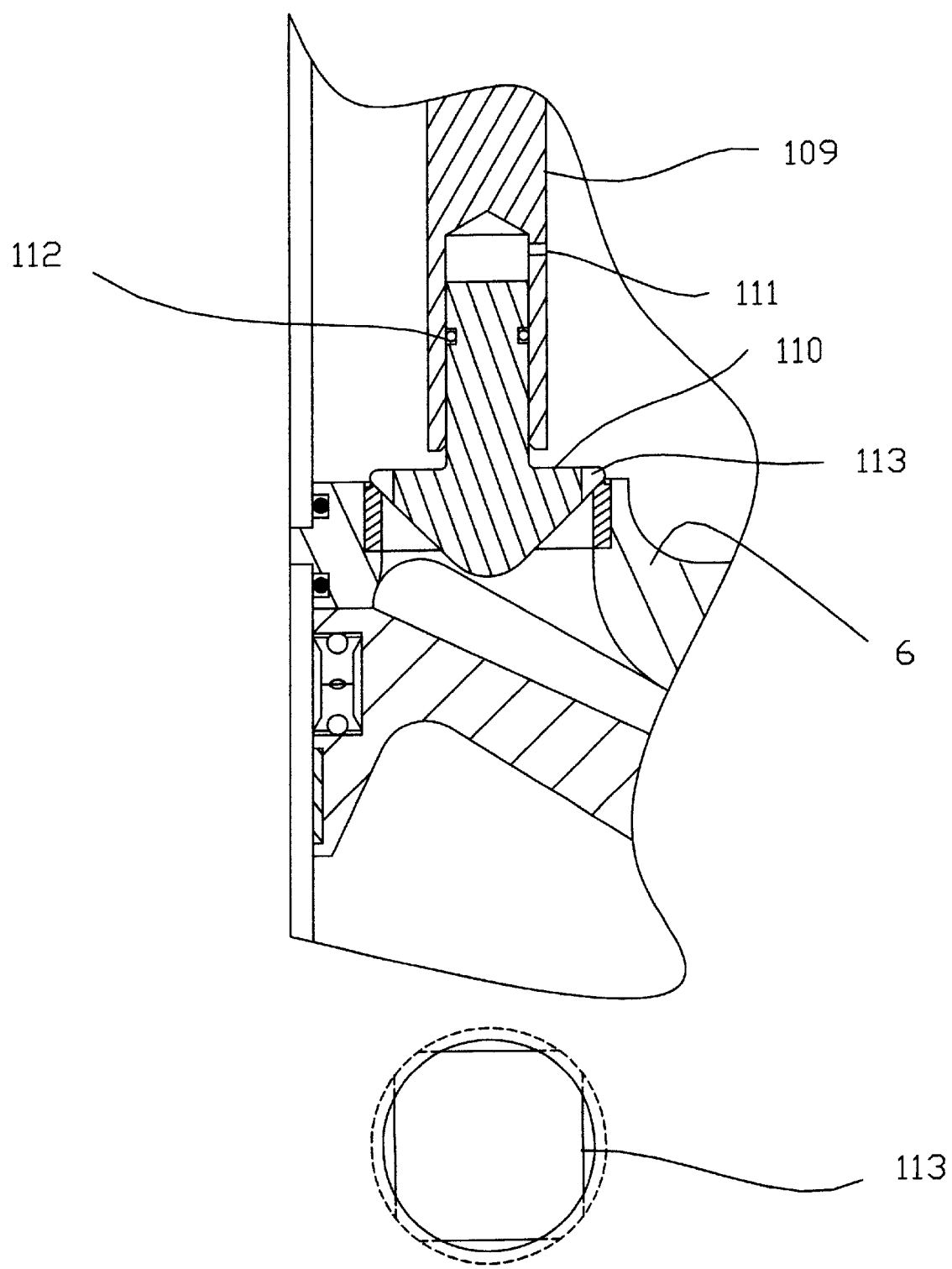
FIG. 7 shows a valve head extension mechanism.

FIGS. 7 and 8A through 8C show alternate embodiments of the valve stem, in which the fixed valve head shown earlier is replaced by two different mechanisms. The purpose of the mechanisms is to modify the damping, in the first case, and both the maximum energy absorption and the damping, in the second case. In FIGS. 7 and 8, the tops of valve stems 109 and 209 are connected to cylinder assembly 1 (FIG. 2A) with the same mechanism as in the original embodiment above.

In FIG. 7, valve head 110 is allowed to slide within valve stem 109, with only slight friction provided by o-ring 112. Vent 111 prevents restriction of movement of valve head 110 by air or fluid pressure inside valve stem 109. Valve head 110 has a flowby passage created by flats 113 on its sides, the size of which control the minimum opening of the orifice when valve head 110 is against the seat. When fluid is flowing down through the orifice, valve head 110 is forced down against the seat by the pressure across the orifice and the area for flow caused by the bypass passages due to flats 113 controls the damping. When fluid is flowing up through the orifice, valve head 110 is forced up, and the orifice opening gets bigger, lowering the damping. The size of the orifice when fluid is flowing up is controlled by the position of valve stem 109 as in the original embodiment. This mechanism allows a larger opening when fluid is flowing up so that moderate landing velocities do not produce too high initial pressures, yet at very low landing velocities and taxiing, the damping is still sufficient because of the extra restriction when fluid is flowing down.

Figure 8A:
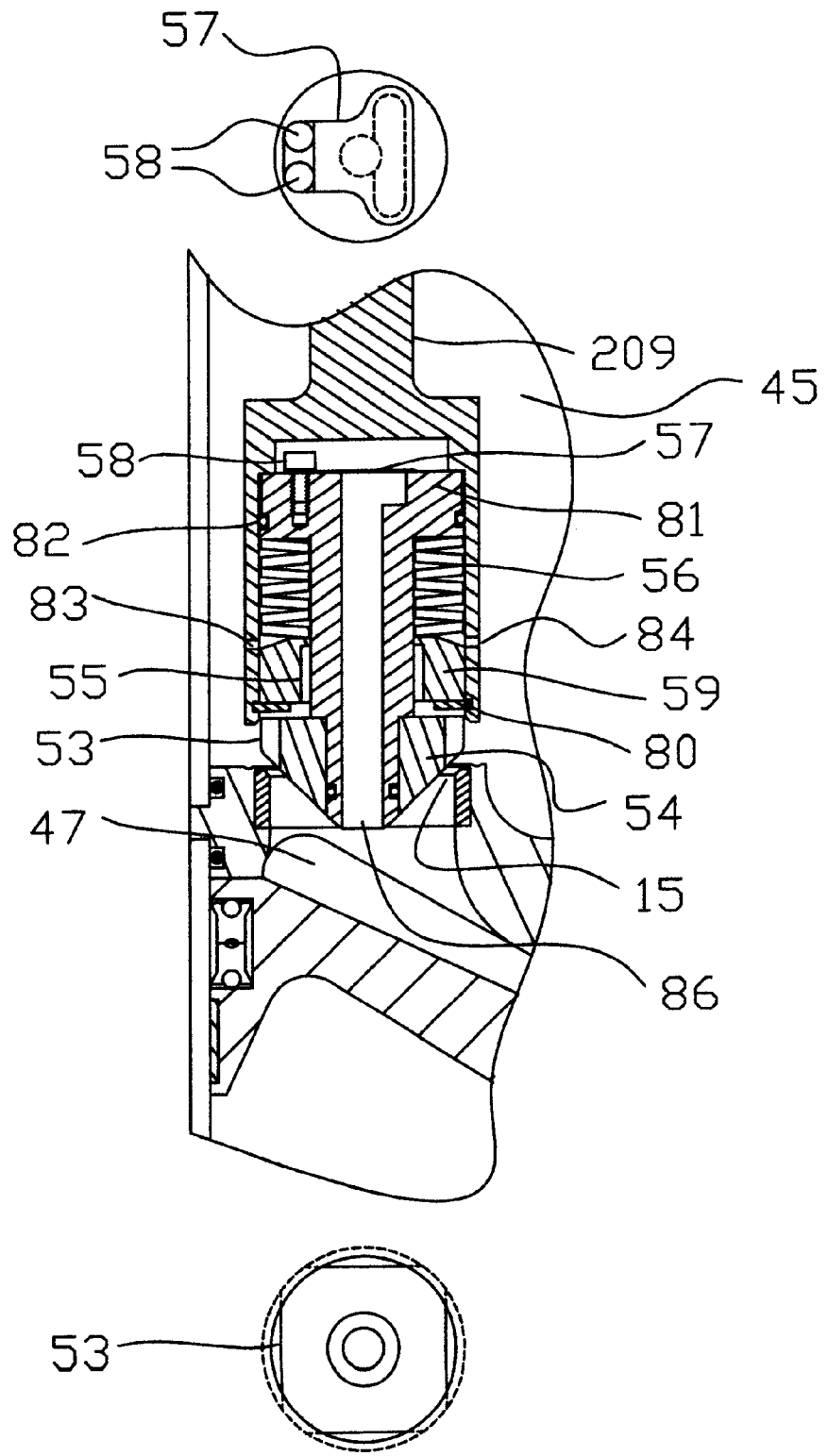
FIG. 8A shows a alternate embodiment of a valve head extension mechanism,.
Figure 8B:
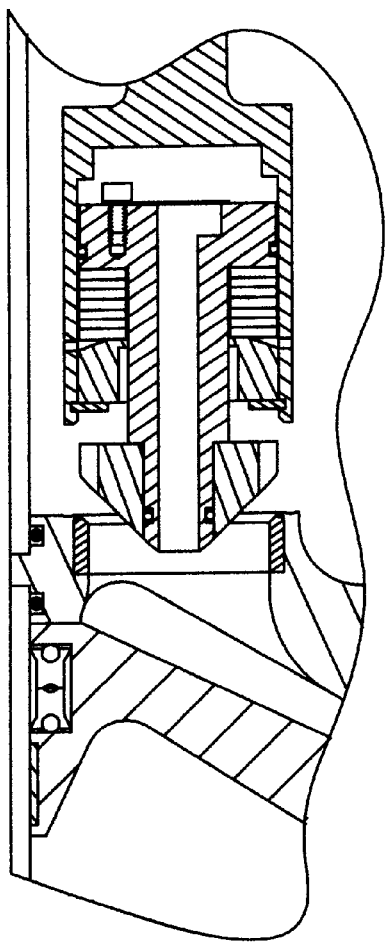
FIG. 8B shows the valve head extension mechanism of FIG. 8A, with the valve head piston extended for high pressure drop upward flow.
Figure 8C:
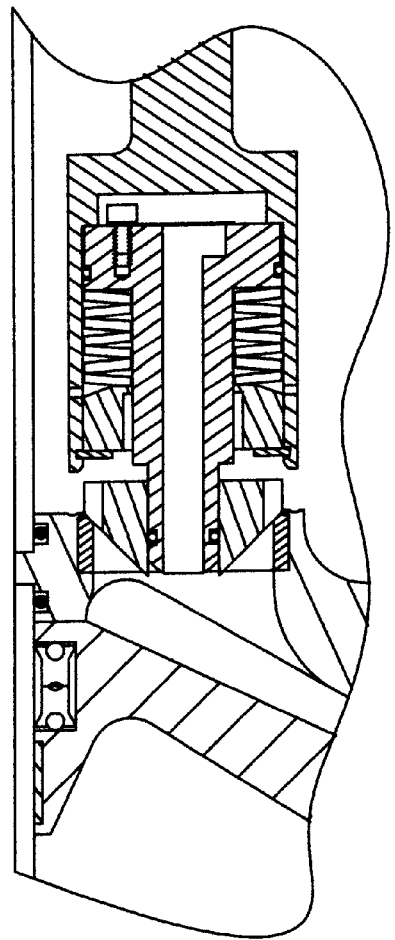
FIG. 8C shows the valve head extension mechanism of FIG. 8A, with the valve head piston retracted but the valve head extended for downward flow.

FIG. 8A shows a mechanism which holds a fixed minimum opening at low and moderate landing velocities, but eliminates the minimum opening during hard landings for higher energy absorption. Valve head 54 has flats 53. Valve head 54 slides on the bottom of valve head piston 81 as shown in FIG. 8C, forming a mechanism for adjusting the damping which operates just like that described in FIG. 7. With reference again to FIG. 8A, valve head piston 81 is allowed to slide against the interior of valve stem 209, sealed by o-ring 82. Valve head piston 81 also slides against Teflon bearing 55 installed in guide 59. Guide 59 is prevented from moving downward by snap ring 80. Belleville washers 56 form a spring which is compressed upon installation with a selected force, and forces valve head piston 81 upward. Valve head piston 81 has a large axial hole 86 drilled through it, capped by a flapper one-way valve 57 held on by screws 58. Pressure in volume 45 acts on the bottom of valve head piston 81 through vent 84. When a high pressure occurs in volume 47, the pressure in volume 47 is conveyed through a hole 86 in valve head piston 81 to the top of valve head piston 81. Since the top of valve head piston 81 has an area greater than the area of the bottom of valve head 54, a large enough pressure difference on the difference in area will move valve head piston 81 downward, extending the valve head. Flapper one-way valve 57 maintains the high pressure above the piston long enough for the crash landing cycle to be completed, but is leaky enough to allow the pressure to escape before a subsequent landing. For example, during a 20 foot per second landing, the cylinder experiences the same initial pressure in volume 47 as before because the entire valve stem 209 moves upwards even though at the same time the mechanism shown in FIG. 8B is moving valve head 54 downwards a smaller amount. As the cylinder decelerates the aircraft, and the velocity of hydraulic fluid through orifice 15 is reduced, the entire valve stem 209 moves downwards, while the piston 81 and extended valve head 54 reduce the annular orifice 15 opening to maintain a more nearly constant pressure throughout the middle range of the cylinder travel, to absorb more energy. Yet during normal and soft landings, the minimum opening 15 is kept larger, so that the initial pressure is lower and allows for a softer feel.

Figure 9B:
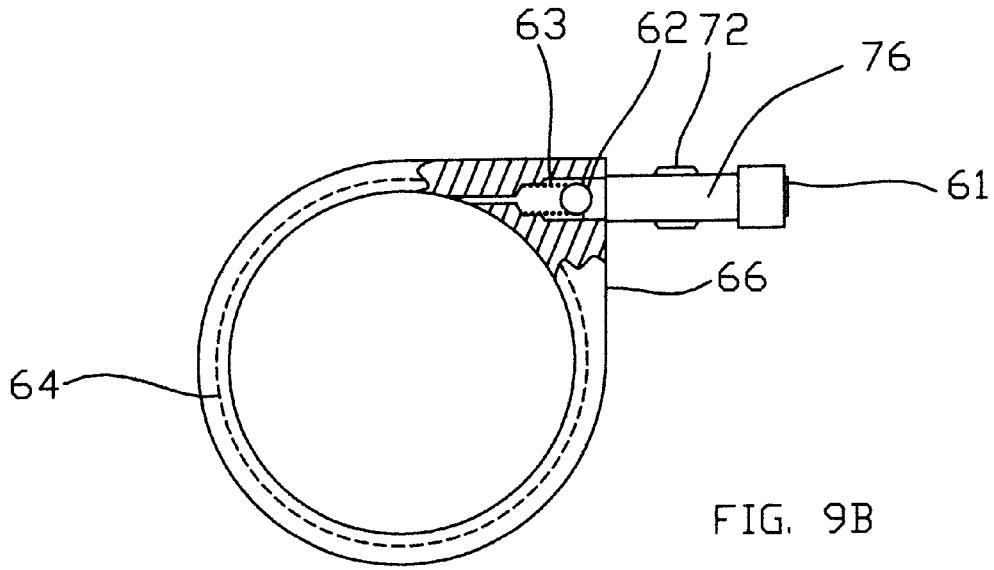
FIG. 9B is a top view of the air/oil separator of FIG. 9A.
Figure 9A:
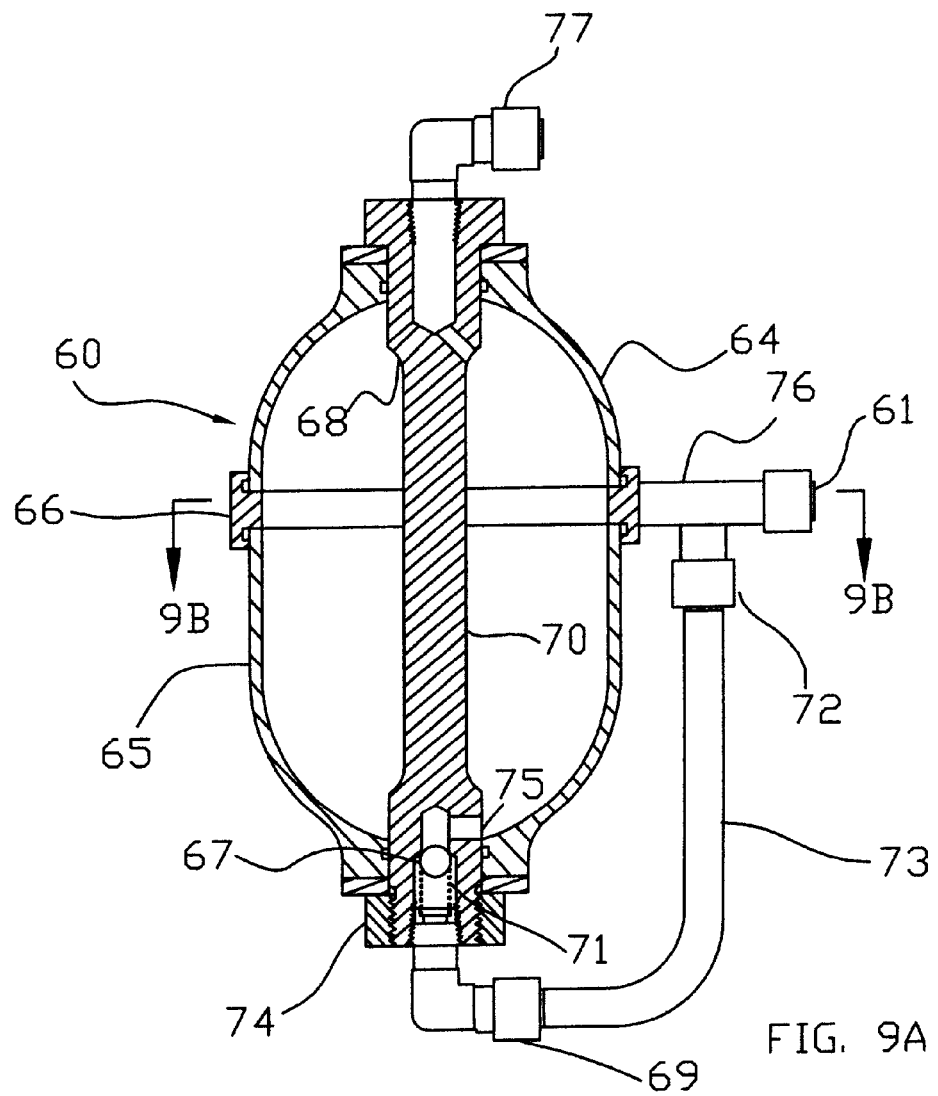
FIG. 9A is a longitudinal cross-sectional view of an air/oil separator for the landing gear cylinder.

FIG. 9A shows a cross sectional side view of an air/oil separator 60, and FIG. 9B shows a top view. The air/oil separator is used in conjunction with the shock absorber assembly to handle the air/oil mixture which emerges from top cap pressure fitting 51 when air is vented to the atmosphere during landing gear retraction. Air/oil separator 60 consists of upper shell 64 and lower shell 65 sealed by ring 66, all three held together by shaft 70 and nut 74. Hose fitting 77 is threaded into the top end of shaft 70, which has holes 68 drilled through its sides so that air can pass freely between hose fitting 77 and the interior of shells 64 and 65. Hose fitting 69 can drain all fluid that accumulates in the interior of shell 65. Tee fitting 76 is threaded into ring 66 such that fluid or gas passing into the air/oil separator enters tangentially. Tee fitting 76 has hose fittings 61 and 72. Hose fitting 61 is connected to the top cap pressure fitting 51 of shock absorber assembly 1, and hose fitting 72 is connected by hose 73 to hose fitting 69. All joints are sealed by o-rings (not shown).

Passage between the interior of air/oil separator 60 and tee fitting 76 is controlled by a one-way valve consisting of ball 62 and spring 63. The one-way valve only allows flow into the air/oil separator. A similar one-way valve consisting of ball 67 and spring 71 only allows flow out of the air oil separator through hose fitting 69.

When the top cap pressure fitting 51 is vented to the atmosphere during landing gear retraction, mixed oil and air rushes through gas fitting 61 and is directed tangentially around the inside of air/oil separator 60. The oil, since it is heavier than air, tends to be thrown against the side because of centrifugal force and will run down the sides to the bottom. Air can escape through holes 68 and out through hose fitting 76 to the atmosphere. Holes 68 are in the center of the vortex created by circular flow of the air/oil mixture, such that very little oil escapes through holes 68.

When the top cap pressure fitting is pressurized to lower the landing gear, pressurized air pushes the oil accumulated in the bottom of the separator 60 through the one-way valve in hose fitting 69 and back to top cap pressure fitting 52. The air/oil separator 60 could be installed within volume 45 (FIG. 2A) so that it would not be subjected to as high pressures, and to avoid exposed hoses. However, the size of volume 45 outside of the air/oil separator 60 would need to remain the same.

The invention has significant advantages. It is capable of absorbing high shock forces without permanent deformation. The shock absorber also is able to smoothly handle low forces which occur during taxiing and soft landings. The shock absorber operates also as a retract and extension device for the landing gear. It operates with low pressure air.

The invention is not limited to the embodiments described above but is susceptible to various changes without departing from the scope of the invention.

I claim:

1. A shock absorber for fitting to the landing gear of an aircraft, the shock absorber comprising:
    a cylinder having a first end and a second end and containing a hydraulic fluid;
    a piston located in the cylinder, the piston having a rod extending outward from the second end of the cylinder;
    an orifice in the cylinder, through which the hydraulic fluid flows as the piston moves toward the first end due to a shock applied; and
    a valve mounted to the cylinder, having a first end adjacent the orifice and a second end exposed to atmospheric pressure, the valve being movable relative to the orifice from a less restrictive position to fluid flow through the orifice to a more restrictive position and being urged toward the more restrictive position by a spring, wherein if a shock applied to the shock absorber is of sufficient magnitude, a pressure differential between atmospheric pressure and pressure between the valve and the piston causes the valve to move toward the less restrictive position to allow a greater flow rate through the orifice.

2. The shock absorber according to claim 1, further comprising a cylinder head fixedly mounted in the cylinder between the first end and the piston, the orifice being located in the cylinder head.

3. The shock absorber according to claim 1, further comprising a cylinder head fixedly mounted in the cylinder between the first end and the piston, the orifice being located in the cylinder head; and wherein the second end of the valve extends sealingly through the first end of the cylinder.

4. The shock absorber according to claim 1, wherein in the more restrictive position, the valve allows a limited flow through the orifice.

5. The shock absorber according to claim 1, wherein the second end of the valve extends sealingly through the cylinder and has a cross-sectional area where it is sealed to the cylinder which is substantially equal to a cross sectional area of the orifice.

6. The shock absorber according to claim 1, further comprising:
an adjustment mechanism mounted to the valve for adjusting a minimum gap between the first end of the valve and the orifice.

7. A shock absorber according to claim 1, further comprising:
an adjustment mechanism mounted between the valve and the cylinder for adjusting a compression force of the spring to adjust the force at which the valve is urged toward the orifice.

8. A shock absorber according to claim 1, wherein in the more restrictive position, the first end of the valve contacts the orifice; and wherein the shock absorber further comprises:
a flowby passage which allows a limited amount of fluid flow through the orifice while the first end of the valve is in contact with the orifice.

9. A shock absorber according to claim 1, wherein the first end of the valve comprises:
a valve head slidably carried by the valve and movable between an upper position and a lower position relative to the valve.

10. A shock absorber according to claim 1, wherein:
the second end of the valve is a valve stem; and
the first end of the valve is a valve head movable between an upper and a lower position relative to the valve stem, and wherein the shock absorber further comprises:
a valve head spring for urging the valve head to the upper position;
a valve head piston mounted to the valve head for movement therewith and configured to move the valve head to the lower position, further restricting the orifice, at a preset pressure drop across the orifice.

11. The shock absorber according to claim 10, further comprising:
a passage for communicating pressure from below the valve head piston to above the valve head piston;
the valve head piston having a cross sectional area which is greater than a cross sectional area of the orifice; and
a one-way valve for preventing, for a limited duration, flow from above the piston to the passage.

12. A shock absorber according to claim 1, further comprising:
a below-piston fluid port for allowing the ingress and egress of fluid into and out of the cylinder between the piston and the second end of the cylinder; and
an upper fluid port between the orifice and the first end of the cylinder for allowing the ingress and egress of fluid into and out of the cylinder, so that the piston can be actuated between extended and retracted positions to raise and lower the landing gear.

13. A shock absorber according to claim 12, further comprising an air/oil separator connected to the upper fluid port such that hydraulic fluid escaping from the cylinder through the upper fluid port during landing gear retraction will be returned to the cylinder during landing gear extension.

14. A method of limiting pressure above a piston in a shock absorber during an impact, while maintaining substantial deceleration throughout the travel of the shock absorber, comprising:
providing an orifice in the cylinder which causes a dampening resistance to movement of the piston when encountering an impact;
providing a valve which moves between a restricted position and an open position relative to the orifice;
exposing a portion of the valve to atmospheric pressure such that pressure in the cylinder greater than atmospheric pressure tends to move the valve to the open position;
urging the valve toward the restricted position by a spring; and
moving the valve toward the open position when encountering an impact of sufficient magnitude to provide a pressure in the cylinder which overcomes a force exerted by the spring, thereby reducing the dampening resistance and lowering the pressure exerted by movement of the piston.

15. A shock absorber for fitting to the landing gear of an aircraft, having a cylinder sealed on an upper end and sealed on a lower end, a cylinder head fixed within the cylinder and sealingly dividing the cylinder into an upper chamber and a lower chamber, a piston sliding in sealed manner in the lower chamber and dividing the lower chamber into an above-piston chamber and a below-piston chamber, a piston rod having one end connected to the piston and extending outside of the cylinder through a sealed opening in the lower end, a quantity of hydraulic fluid in the above-piston chamber, and a quantity of pressurized gas in the upper chamber, the improvement comprising:
the cylinder head having at least one orifice, placing the above-piston volume in fluid communication with the upper chamber;
a valve having a valve head joined to a valve stem, the valve head being located adjacent to the orifice for controlling flow through the orifice, the valve stem sealingly passing through the upper end of the cylinder to atmosphere;
a spring mounted to the valve stem which urges the valve toward the orifice; and
the valve moving linearly to adjust a gap between the valve head and the orifice in response to a difference in pressure between pressure in the above-piston chamber and atmospheric pressure.

16. A shock absorber according to claim 15, wherein the valve has a closed position, and in the closed position, the orifice remains partially open.

17. A shock absorber according to claim 15, wherein
the valve stem has a cross-sectional area where it passes through the upper end of the cylinder that is generally equal to a cross sectional area of the orifice.

18. A shock absorber according to claim 15, wherein:
the volume of the above-piston chamber is substantially equal to the volume of the upper chamber when the piston rod is fully extended outside the shock absorber.

19. A shock absorber according to claim 15, further comprising:
an adjustment mechanism mounted to the valve stem for adjusting a minimum gap between the valve and the orifice.

20. A shock absorber according to claim 15, further comprising:

an adjustment mechanism mounted between the valve stem and the cylinder for adjusting a compression force of the spring to adjust the force at which the valve is urged toward the orifice.

21. A shock absorber according to claim 15, wherein the valve head is movable between an upper and a lower position relative to the valve stem, and wherein the shock absorber further comprises:

a valve head spring for urging the valve head to the upper position;

a valve head piston mounted to the valve head for movement therewith and configured to move the valve head to the lower position, further restricting the orifice, at a preset pressure drop across the orifice.

22. The shock absorber according to claim 21, further comprising:

a passage for communicating pressure from below the valve head piston to above the valve head piston;

the valve head piston having a cross sectional area which is greater than a cross sectional area of the orifice; and a one-way valve for preventing, for a limited duration, flow from above the piston to the passage.

23. A shock absorber according to claim 15, further comprising:

a below-piston chamber fluid port for allowing the ingress and egress of fluid into and out of the below-piston chamber; and an upper chamber fluid port for allowing the ingress and egress of fluid into and out of the upper chamber, so that the piston can be actuated between extended and retracted positions to raise and lower the landing gear.

24. A shock absorber according to claim 23, further comprising an air/oil separator connected to the upper chamber fluid port such that hydraulic fluid escaping from the upper chamber during landing gear retraction will be returned to the upper chamber during landing gear extension.

\* \* \* \* \*